March 5, 1968 TAKASHI KUBOTA ET AL 3,372,338

RADIO COMMUNICATION RECEIVER WITH STANDBY CONTROL AND WARNING CIRCUIT

Filed May 26, 1964 2 Sheets-Sheet 1

INVENTORS
TAKASHI KUBOTA
SEISHI YAMAZAKI

BY Paul M. Craig, Jr.

ATTORNEY

INVENTORS
TAKASHI KUBOTA
SEISHI YAMAZAKI
BY Paul M. Craig, Jr.
ATTORNEY 3,372,338

RADIO COMMUNICATION RECEIVER WITH STANDBY CONTROL AND WARNING CIRCUIT

Takashi Kubota, Kamakura-shi, and Seishi Yamazaki, Yokohama, Japan, assignors to Hitachi, Ltd., Tokyo, Japan, a corporation of Japan Filed May 26, 1964, Ser. No. 370,240
Claims priority, application Japan, May 28, 1963, 38/26,568, 38/26,569; Oct. 10, 1963, 38/52,795; Oct. 17, 1963, 38/54,845
14 Claims. (Cl. 325—364)

This invention relates to a radio communicating apparatus, particularly of the portable type, in which means are provided for detecting the calling signal from another to produce an oscillation sound of particular frequency, thereby providing notification that the companion is calling.

In general, a radio communicating apparatus should be kept in a standby state in order that it can receive calling signals whenever transmitted from another station. For this purpose, at least a part of the radio apparatus should be kept energized, however in portable radio apparatus utilizing dry cells as electrical sources, the dry cells are inconveniently consumed promptly by such continuous energization.

In such a kind of radio apparatus, therefore, a relay or the like is desirably employed in order to keep the electric source disconnected during non-signal periods, but in such a case, there is required an additional provision for actuating the relay or the like in response to incoming signals so as to have the battery source connected in the circuit. Such arrangements result in relatively complex circuitry for the radio apparatus, as well as, a relatively large size for the same.

An object of the present invention is to provide a radio communicating apparatus in which less electric current is required during the standby state for saving the power source from prompt consumption, and yet, provision is also made whereby incoming call signals can be detected without failure.

Another object of the present invention is to provide a radio communicating apparatus which can detect any call signal for a companion apparatus and which will produce oscillation sound of particular frequency, thereby providing notification that the companion is calling.

Another object of the present invention is to provide a radio communicating apparatus of the kind above-specified, which does not require an additional receiver device responsive to call signals for connecting the radio apparatus to the electrical source which is otherwise kept disconnected from the former.

A further object of the present invention is to provide a radio communication apparatus which can operate with stability even when receiving noise or other disturbing signals, and is able to distinguish incoming call signals from noise for notifying the companion's call without fail.

A further object of the present invention is to provide a radio communication apparatus which can operate positively even at noisy places to confirm incoming call signals.

A still further object of the present invention is to provide a radio communicaton apparatus which maintains proper gain to always provide maximum sensitivity, also when it is receiving message signals from the companion apparatus.

The present invention is characterized in that, during the standby period, power consumption is decreased by interrupting collector current and bias current of the low-frequency power amplifier that normally consumes over a half of the whole current consumed in the radio communication apparatus, and that a feedback oscillation circuit is formed by the low-frequency amplifier, and is operated by automatic gain control voltage which appears in the output of the detector when it receives a call signal and detects the same, for providing notification of the incoming call signal.

These and other objects, features and advantages of the present invention will become more apparent from the following detailed description of the invention when taken in conjunction with the accompanying drawings, which illustrate several features of the present invention, and wherein.

Figures 1, 2, 3:
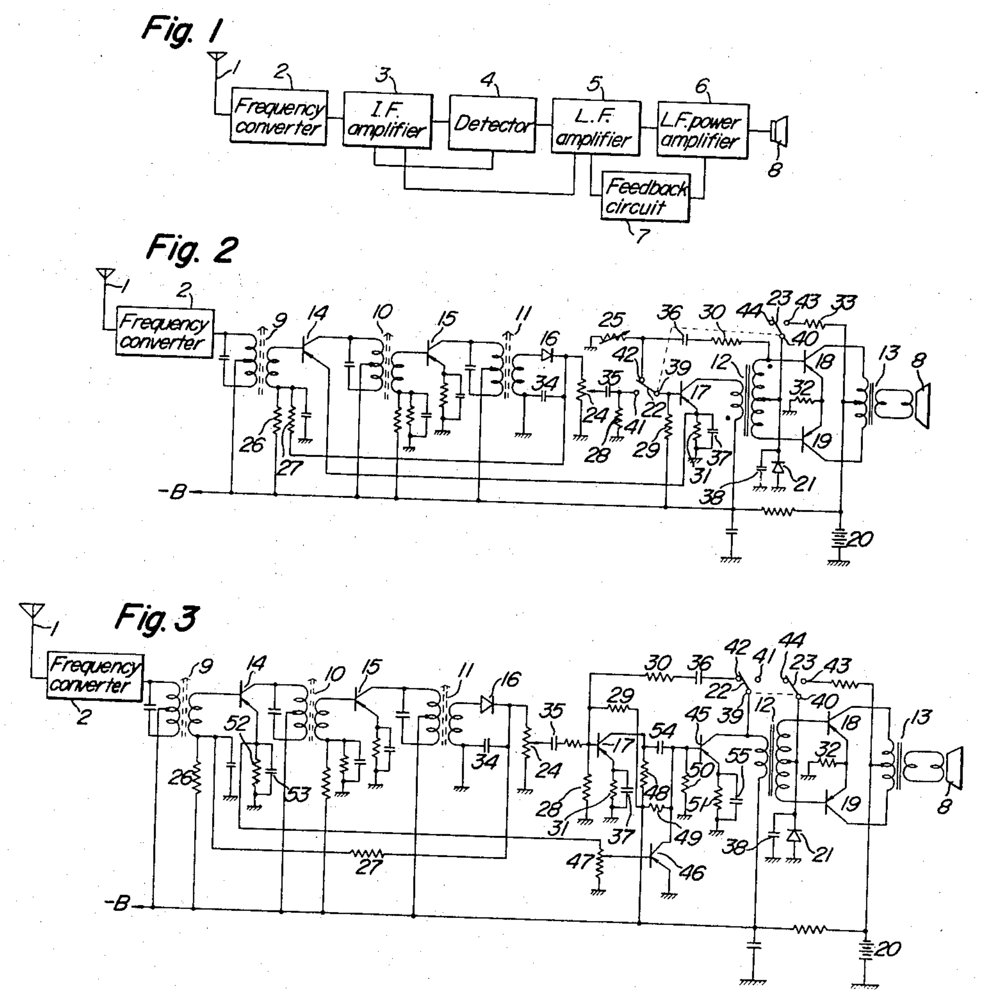
FIGURE 1 is a basic block diagram of a radio communication receiver in accordance with the present invention.
FIGURE 2 is a circuit diagram illustrating the detailed circuitry of the system of FIGURE 1.
FIGURES 3 through 6 are circuit diagrams illustrating other embodiments of the present invention.

Referring now to FIG. 1, the receiver portion of a radio communication apparatus embodying the present invention comprises an antenna 1, a frequency converter 2, an intermediate-frequency amplifier 3, a detector 4, a low-frequency amplifier 5, a low-frequency power amplifier 6, a feedback circuit 7, and a speaker 8.

According to the present invention, in the standby condition of the receiver, the bias current and collector current of the low-frequency power amplifier 6 are interrupted to decrease current consumed in the communication apparatus, the gain of low-frequency amplifier 5 is lowered, and the feedback circuit 7 is established between the low-frequency amplifier 5 and the low-frequency power amplifier 6 to form a feedback oscillator. When a call signal comes in during such a condition of the receiver, the high-frequency signal induced in the antenna 1 is frequency converted in the frequency converter 2 by the signal generated by a local oscillator to produce an intermediate-frequency signal, which is fed to and amplified by the intermediate-frequency amplifier 3 to adequate magnitude. The intermediate-frequency signal thus amplified is applied to the detector 4 where it is detected and becomes separated into a high-frequency component, an audible-frequency component, and a direct-current component. The direct-current component obtained by the detector action is fed back to the intermediate-frequency amplifier 3 as automatic gain-controlling voltage, for controlling the gain of the amplifier 3 to maintain the intermediate-frequency signal voltage supplied to the detector 4 at a constant level. The intermediate-frequency amplifier 3 with its gain controlled by the automatic gain-controlling voltage has its operating current decreased with the gain lowered as above-described, thus decreasing bias voltages of electrodes. A portion of bias voltage of the intermediate-frequency amplifier 3 is applied to the low-frequency amplifier 5 for controlling the bias voltage of the latter to increase its gain. The low-frequency amplifier 5 with the gain thus increased begins to oscillate together with the low-frequency power amplifier 6 for producing a particular-frequency sound in the speaker 8 to indicate that a call signal is coming in. Upon confirmation of the call signal indicated by the speaker 8, the operator should recover the bias current of low-frequency power amplifier 6 to normal and cut out the feedback circuit 7, thus setting the apparatus in the normal receiving state.

FIG. 2 shows one embodiment of the invention in which the low-frequency amplifier 5 is of a single stage. The receiver comprises intermediate-frequency transformers 9, 10, 11, an input transformer 12, an output transformer 13, intermediate-frequency amplifier transistors 14 and 15, a detector diode 16, a low-frequency amplifier transistor 17, low-frequency power amplifier transistors 18 and 19, an electrical source in the form of battery 20, a varistor 21, switches 22 and 23, variable resistors 24 and 25, fixed resistors 26, 27, 28, 29, 30, 31, 32 and 33, and condensers 34, 35, 36, 37 and 38. The switches 22 and 23 are respectively provided with movable contacts 39 and 40 and stationary contacts 41, 42, 43 and 44.

As illustrated, the primary winding of intermediate-frequency transformer 9 is connected to the output terminals of frequency converter 2 of the preceding stage. One terminal of the secondary winding of transformer 9 is connected to the base electrode of intermediate-frequency amplifier transistor 14, while the other terminal is connected to the negative side of battery 20 through resistor 26, thus applying a bias voltage to the base electrode of transistor 14. The other secondary terminal of transformer 9 is also connected, through resistor 27, to the cathode of detector diode 16. The anode of diode 16 is connected to one terminal of the secondary winding of intermediate-frequency transformer 11, while the cathode is connected to the ground through variable resistor 24, and also to the other secondary terminal of transformer 11 through condenser 34. The sliding terminal of resistor 24 is connected to a stationary contact 41 of switch 22 through condenser 35. The stationary contact 41 is connected to the ground through resistor 28. The movable contact 39 of switch 22 is connected to the base electrode of low-frequency amplifier transistor 17, and also to the negative side of battery 20 through resistor 29. The stationary contact 42 of switch 22 is connected to the ground through variable resistor 25, and also to one secondary terminal of the input transformer 12 through resistor 30 and condenser 36 in series. The emitter electrode of transistor 17 is connected to the ground through resistor 31 and condenser 37 in parallel, and also to the emitter electrode of intermediate-frequency amplifier transistor 14 of the preceding stage. The collector electrode of transistor 17 is connected to one primary terminal of input transformer 12, while the other primary terminal is connected to the negative side of battery 20. One secondary terminal of input transformer 12 is connected to the base electrode of one power amplifier transistor 18, while the other secondary terminal is connected to the base electrode of the other power amplifier transistor 19. The secondary winding of transformer 12 is provided with a mid tap which is connected to the cathode of varistor 21, and also to the ground through condenser 38, and to the movable contact 40 of switch 23. Varistor 23 is a temperature dependent resistant element, constituted by a junction-type germanium diode. The forward impedance of this device is very low and has a variable characteristic depending upon the ambient temperature. The impedance of the device is decreased when the ambient temperature is increased but is increased when the temperature is decreased, so that the electrical potential between the base and emitter electrodes of transistors 18 and 19 are adjusted depending upon the ambient temperature to thereby hold the collector currents in the transistors 18 and 19 constant. The emitter electrodes of low-frequency power amplifier transistors 18 and 19 are connected together and to the ground through resistor 32. Their collector electrodes are connected respectively to the opposite terminals of the primary winding of output transformer 13 which has a mid tap connected to the negative side of battery 20, and also to the stationary contact 43 of switch 23 through resistor 33. The secondary winding of transformer 13 is connected across the voice coil of speaker 8. The positive side of battery 20 is connected to the ground. Switches 22 and 23 are mechanically interconnected.

In the standby state of the apparatus, the movable contacts 39 and 40 of switches 22 and 23 are in engagement with stationary contacts 42 and 44, respectively, thereby interrupting electric current that would flow through varistor 21 as the base bias current of low-frequency power amplifier transistors 18 and 19, making the voltage zero between the bases and emitters of transistors 18 and 19, and interrupting the collector currents thereof. By virtue of the interruption of the above-identified bias and collector currents, electric current consumed in the whole radio communication apparatus is decreased to below a half of the current normally consumed therein. The low-frequency amplifier transistor 17 has its base electrode connected to one secondary terminal of the input transformer 12 through condenser 36 and resistor 30 to form a feedback oscillation circuit, with the base bias voltage decreased by virtue of variable resistor 25 to lower the gain. The feedback oscillation circuit is thus ready for oscillation.

Under such a condition, if a call signal from companion apparatus comes in, the high-frequency signal induced thereby in the antenna 1 is frequency converted by the local oscillation signal in frequency converter 2, and the intermediate-frequency signal thus produced is applied to the primary winding of transformer 9. The secondary output of the same is applied to amplifier transistor 14, and through the same to the next stage amplifier transistor 15. The amplified signal of intermediate frequency appearing across the secondary winding of transformer 11 is detected by detector diode 16. The intermediate-frequency signal thus detected is separated into a high-frequency component, a low-frequency component, and a D.C. component, the high-frequency component returning to the secondary winding of transformer 11 through condenser 34, while the low-frequency component returning to the same secondary winding through resistor 24, and being taken out from the sliding terminal of resistor 24 as a low-frequency signal. The D.C. component serves as automatic gain controlling voltage to be applied to the base electrode of intermediate-frequency amplifier transistor 14 through resistor 27. The gain control potential thus applied to the base of transistor 14 is positive with respect to the ground, and the base electrode of transistor 14 is biased positively to decrease the potential difference between the base and emitter electrodes. The collector current of transistor 14 is thus decreased, resulting in lowered gain. On the other hand, the decrease in collector current of transistor 14 results in decrease of current flowing through the emitter resistor 31 connected with the emitter of transistor 17, with corresponding decrease in voltage drop in the resistor 31 to increase the base-emitter potential difference. The low-frequency amplifier transistor 17 is thus increased in its collector current, with increased gain. Consequently, the transistor 17 begins to oscillate by the positive feedback circuit including resistor 30, condenser 36, and switch contacts 42, 39. The output voltage of this oscillation is applied across the primary winding of input transformer 12, and the secondary output thereof is supplied between the base and emitter electrodes of low-frequency power amplifier transistors 18 and 19. The transistors 18 and 19 are thus excited, and begin to operate by flow of collector current during the negative half-cycle period of oscillation output voltage, for amplifying the oscillation signal which is supplied to the speaker 8 through output transformer 13 for providing a sound signal to indicate the incoming call signal.

Upon receipt of the particular-frequency sound signal, the operator actuates the ganged switches 22–23 to connect movable contacts 39 and 40 with stationary contacts 41 and 43, respectively, for supplying the normal bias current through the varistor 21 to apply the proper bias voltage to transistors 18 and 19 for their normal operation. In addition, the feedback circuit of transistor 17 is cut out, and the transistor 17 restores its normal operation as a low-frequency amplifier, with low-frequency signals supplied between its base and emitter electrodes.

In the embodiment shown in FIG. 3, the low-frequency amplifier is formed in two stages, and the gain of low-frequency amplifying stages during the standby period is controlled by change in the emitter-collector impedance of the other transistor. In FIG. 3, 45 is the second-stage low-frequency amplifier transistor, and its base bias voltage is under control by a control transistor 46. The apparatus of FIG. 3 further comprises a variable resistor 47, fixed resistors 48, 49, 50, 51 and 52, and condensers 53, 54 and 55.

As illustrated in FIG. 3, the collector electrode of the first-stage low-frequency amplifier transistor 17 is connected to the negative side of battery 20 through resistor 48, and also to the base electrode of the second stage transistor 45 through condenser 54. The collector electrode of transistor 45 is connected to one primary terminal of input transformer 12, the other primary terminal thereof being connected to the negative side of battery 20. The emitter electrode of transistor 45 is connected to the ground through resistor 51 and condenser 55 in parallel, and the base electrode is connected to the ground through resistor 50. The movable contact 39 of switch 22 is connected to one primary terminal of input transformer 12, and the stationary contact 42 is connected to the base electrode of transistor 17 through condenser 36 and resistor 30 in series. The emitter electrode of intermediate-frequency amplifier transistor 14 is connected to the ground through resistor 52 and condenser 53 in parallel, and also through variable resistor 47. The collector electrode of control transistor 46 is connected to the base electrode of low-frequency amplifier transistor 45, and also to the negative side of battery 20 through resistor 49. The base electrode of transistor 46 is connected to the slide terminal of variable resistor 47, and the emitter electrode thereof is connected direct to the ground. The arrangement is otherwise similar to that shown in FIG. 2, corresponding members being designated by same reference numerals.

During the standby period, the movable contacts 39 and 40 of switches 22 and 23 respectively engage stationary contacts 42 and 44, and base bias currents of low-frequency power amplifier transistors 18 and 19 are interrupted, the collector current thereof being thus interrupted to decrease current consumption in the apparatus. The collector electrode of transistor 45 is connected to the base electrode of transistor 17 through the feedback circuit of condenser 36 and resistor 30, transistors 17 and 45 forming a feedback oscillation circuit.

Under such a condition, automatic gain controlling voltage is not generated, with the maximum collector current of intermediate-frequency amplifier transistor 14, increased voltage drop in variable resistor 47 and resistor 52 due to the emitter current flowing therethrough, and increased potential difference between the base and emitter of control transistor 46. Consequently, the collector current of control transistor 46 is increased, and its emitter-collector impedance is lowered, resulting in a substantial ground connection of the base electrode of low-frequency amplifier transistor 45. The gain of transistor 45 is thus decreased, and transistors 17 and 45 do not oscillate, but are ready for oscillation.

When a call signal comes in under such a condition, the intermediate-frequency signal produced in frequency converter 2 is amplified by amplifiers 14 and 15, and detected by detector diode 16. The D.C. component of intermediate-frequency signal taken out of diode 16 as automatic gain controlling voltage is fed back to the base electrode of intermediate-frequency amplifier 14. As a result, the collector current of transistor 14 is decreased, the emitter current flowing through resistors 52 and 47 is decreased, with corresponding decrease in voltage drop across resistors 52 and 47, the base-emitter potential difference of control transistor 46 is decreased, and its collector current is decreased. By virtue of this decrease in collector current, the emitter-collector impedance of transistor 46 is increased, and the base electrode of low-frequency amplifier transistor 45 is released from direct connection to the ground. A proper bias voltage is thus applied between the base and emitter of transistor 45, with the gain increased to enter transistors 17 and 45 into oscillation by the feedback circuit. The oscillation output of transistor 45 is supplied between the base and emitter electrodes of low-frequency power amplifier transistors 18 and 19 whose collector currents flow in a negative half-cycle period of oscillation output voltage, and the speaker 8 produces sound of particular frequency to notify the incoming call signal.

The operator then operates switches 22 and 23 to have their movable contacts 39 and 40 engaged stationary contacts 41 and 43, respectively. Thus, the normal bias current flows through the varistor 21 to normally operate low-frequency power amplifiers 18 and 19. In addition, the feedback circuit of resistor 30 and condenser 36 is disconnected from the collector electrode of low-frequency amplifier transistor 45, for entering the latter into normal operation as low-frequency amplifier to amplify the incoming signal.

Figures 4, 5:
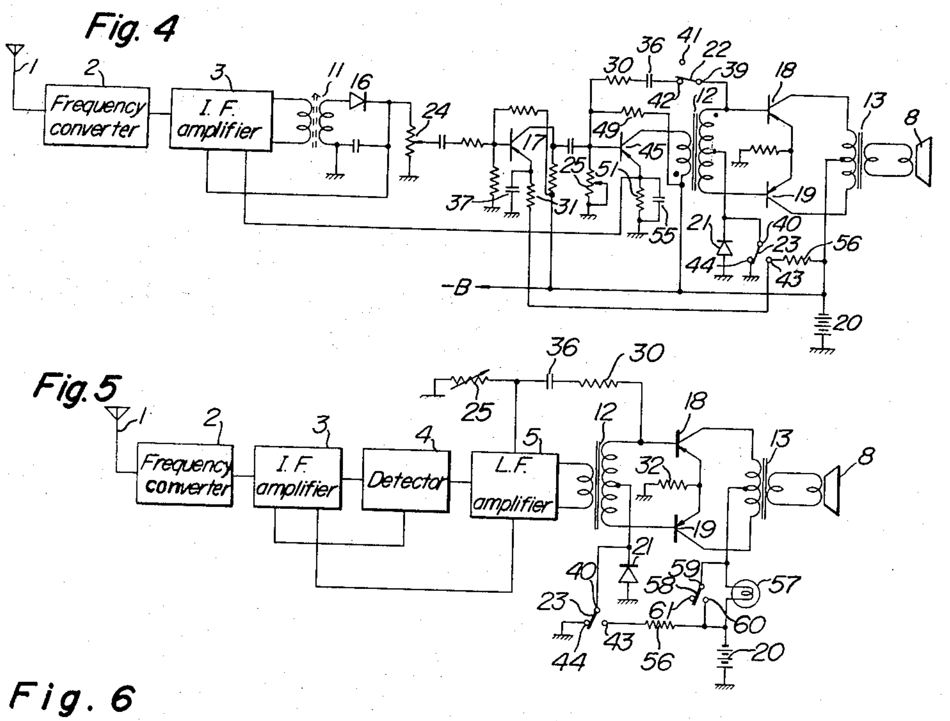

In the embodiment shown in FIG. 4, the low-frequency amplifier is formed in two stages. In the standby state, the operation of the preceding-stage amplifier is stopped, and the succeeding-stage amplifier is prevented from oscillating by virtue of noises and the like, for obtaining higher reliability. Referring to FIG. 4, the emitter electrode of the first-stage low-frequency amplifier transistor 17 is connected to the stationary contact 43 of switch 23 through resistor 31, and to the ground through condenser 37. The base electrode of the second-stage low-frequency amplifier transistor 45 is connected to the ground through variable resistor 25, and to the negative side of battery 20 through resistor 49, and further to the stationary contact 42 of switch 22 through resistor 30 and condenser 36 in series. The emitter electrode of transistor 45 is connected to the ground through resistor 51 and condenser 55 in parallel, and to the emitter electrode of a transistor, not shown, forming the intermediate-frequency amplifier 3. The cathode of varistor 21 is connected to the secondary mid tap of input transformer 12, and also to the movable contact 40 of switch 23, while the anode is connected direct to the ground. One stationary contact 43 of switch 23 is connected to the negative side of battery 20 through resistor 56, while the other stationary contact 44 is connected to the ground. The movable contact 39 of switch 22 is connected to one secondary terminal of input transformer 12. The arrangement is otherwise similar to that shown in FIGS. 1 and 2, corresponding members being designated by same reference numerals.

During the standby period of the apparatus shown in FIG. 4 the movable contacts 39 and 40 of switches 22 and 23 are respectively in engagement with stationary contacts 42 and 44. Then, the varistor 21 is short-circuited, and the secondary mid tap of input transformer 12 is connected to the ground, reducing to zero the emitter-base bias voltages of low-frequency power amplifier transistors 18 and 19, whose bias currents and collector currents are thus interrupted to decrease current consumption in the apparatus. The base electrode of low-frequency amplifier transistor 45 is connected to one secondary terminal of input transformer 12 through the feedback circuit of resistor 30 and condenser 36 to form an oscillation circuit.

Under such a condition as above, the connection of the emitter of transistor 17 to the negative side of battery 20 causes a reverse bias voltage to be applied between the base and emitter electrodes, and there is no collector current flowing. Its operation is thus stopped. Consequently, even if noise or other obstructing signal is received, the output of detector diode 16 is not supplied to the base electrode of low-frequency amplifier transistor 45, which does not oscillate but is ready for starting oscillation.

When a call signal comes in from a companion apparatus, the D.C. component of the incoming signal, or the automatic gain-controlling voltage, is fed back to the transistor base of intermediate-frequency amplifier 3, for decreasing the collector current thereof to decrease the voltage drop across the emitter resistor 51 of low-frequency amplifier transistor 45. Consequently, the gain of transistor 45 is raised to start the oscillation. The output voltage of this oscillation excites low-frequency power amplifier transistors 18 and 19, and the speaker 8 operates to produce call sound.

The operator, then, actuates switches 22 and 23 to have movable contacts 39 and 40 engage stationary contacts 41 and 43, respectively. The cathode of varistor 21 is thus connected to the negative side of battery 20 to provide normal bias current for effecting normal operation of low-frequency power amplifier transistors 18 and 19. In addition, the feedback circuit of resistor 30 and condenser 36 is disconnected from the secondary winding of input transformer 12 to stop the oscillation, and the transistor 45 commences normal operation as low-frequency amplifier. The low-frequency amplifier transistor 17 has its emitter electrode connected to the cathode of varistor 21, and its emitter current flows through the varistor, resulting in normal operation of transistor 17 as low-frequency amplifier.

In the standby state of the above-arrangement, the collector and base currents of low-frequency power amplifier transistors 18 and 19 are interrupted, and at the same time, the collector current of low-frequency amplifier transistor 17 of the preceding stage is also interrupted, to decrease the current consumption.

FIG. 5 shows an embodiment of the invention, in which an indication lamp is utilized to give a visible information of the fact that a call signal is coming in. Such an embodiment is particularly useful in case it is used in especially noisy places or in the night time. As illustrated, the secondary mid tap of input transformer 12 is connected to the cathode of varistor 21, and to the movable contact 40 of switch 23. The anode of varistor 21 is connected direct to the ground. The primary mid tap of output transformer 13 is connected to the negative side of battery 20 through an indication lamp 57 across which a switch 58 is connected whose movable contact 59 and a stationary contact 60 are connected respectively to the opposite terminals of lamp 57.

In the standby state of the apparatus, the movable contacts 40 and 59 of switches 23 and 58 are respectively in engagement with stationary contacts 44 and 61, with the cathode of varistor 21 connected to the ground for interrupting the bias current, and with the collector currents of low-frequency power amplifier transistors 18 and 19 interrupted for saving the battery consumption. The primary mid tap of output transformer 13 is connected to the negative side of battery 20 through the indication lamp 57 only.

Upon receipt of a call signal from a companion apparatus, the low-frequency amplifier 5 begins to oscillate, whereby the low-frequency power amplifier transistors 18 and 19 are excited to flow their collector currents from the opposite ends of primary winding of output transformer 13 through its mid tap to the negative side of battery 20 through the indication lamp 57. Thus, the speaker 8 produces sounds, and at the same time the lamp 57 is energized, to give audible and visible informations simultaneously of the incoming call signal. The operator then actuates switches 23 and 58 to have their movable contacts 40 and 59 engaging stationary contacts 43 and 60, respectively. Thereupon, proper bias current flows through the varistor 21 to have low-frequency power amplifier transistors 18 and 19 normally operating, and the lamp 57 is deenergized.

Figure 6:
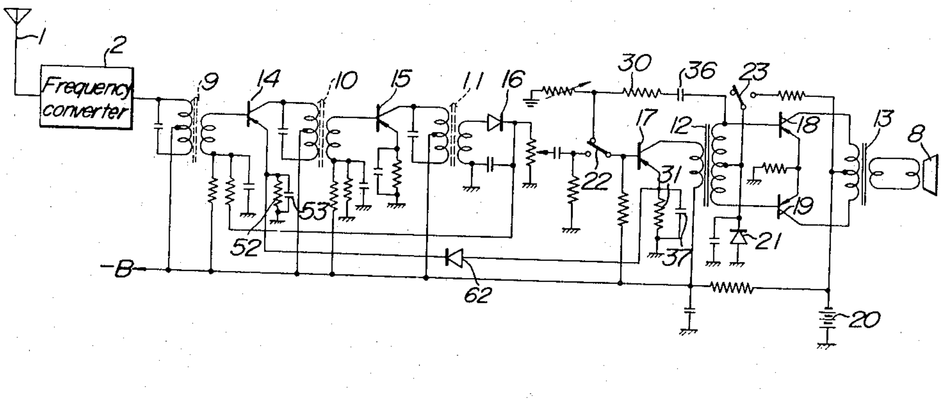

In the embodiment shown in FIG. 6, during the standby period, a diode is inserted between the emitter electrode of low-frequency amplifier transistor forming the oscillation circuit in the standby state and the emitter electrode of intermediate-frequency amplifier transistor to which automatic gain-controlling voltage is applied, for preventing the gain of intermediate-frequency amplifier transistor from varying by changes in the gain of low-frequency amplifier transistor.

Referring to FIG. 2, when the low-frequency amplifier transistor 17 and low-frequency power amplifier transistor 18 and 19 are operating normally as low-frequency amplifiers in response to incoming signals, if the gain of transistor 17 is raised, the increase of its collector current would increase the voltage drop across resistor 31, resulting in decrease of base-emitter potential difference of intermediate-frequency amplifier transistor 14 whose emitter has common connection with the emitter of transistor 17, with decrease in the gain of transistor 14. Consequently, when the incoming signal is too weak, adequate amplification of signal would not be obtained.

In order to remedy the above-mentioned disadvantage, a diode 62 may be inserted between the emitter electrodes of transistors 14 and 17 as illustrated in FIG. 6, which diode is in non-conductive state when the gain of transistor 17 is increased, for operating transistors 14 and 17 independently from each other, thus obtaining stable radio communication apparatus.

Referring now to FIG. 6, the emitter electrode of intermediate-frequency amplifier transistor 14 is connected to the cathode of a diode 62, and to the ground through resistor 52 and condenser 53 in parallel. On the other hand, the emitter electrode of low-frequency amplifier transistor 17 is connected to the anode of diode 62, and to the ground through resistor 31 and condenser 37 in parallel. The arrangement is otherwise similar to that shown in FIG. 2.

In such an arrangement, if the value of resistor 52 is set larger than the value of resistor 31, the automatic gain-controlling voltage is not applied to the base electrode of transistor 14, with its collector current maximum. Its emitter current flows through the resistor 52 for the first time, the voltage drop thereacross rendering the diode 62 conductive. Thus, the emitter current flows in division through resistors 52 and 31, and the diode 62 is kept in conductive condition by virtue of the voltage drop across resistor 52.

Under the above-described condition, the incoming signal is detected by the detector diode 16 to produce automatic gain-controlling voltage which is fed back to the base electrode of intermediate-frequency amplifier transistor 14 to decrease its collector current. As a result, the gain of low-frequency amplifier transistor 17 is increased to enter into oscillation, for operating the speaker 8. Having confirmed the incoming signal by audible sound produced by speaker 8, the operator actuates the switches to have the transistor 17 stopped to oscillate and operating as low-frequency amplifier with increased gain. By reason of increase in the emitter current thereby, the voltage drop across resistor 31 is increased, and the voltage appearing between the opposite ends of resistor 31 becomes larger than that across resistor 52, and the diode 62 is rendered non-conductive. Consequently, the emitter current of transistor 14 flows through resistor 52 only, and the transistor 14 becomes operating independently, and free from the gain of low-frequency amplifier 17.

Practical values of transistors, diodes and resistors are exemplified as follows:

| | |
|---|---|
| Transistors: | |
| **14, 15** | 2SA12 |
| **17** | 2SB75 |
| **18, 19** | 2SB77 |
| **46** | 2SB75 |
| Diode **16, 52** | 1N34 |
| Varistor **21** | HV-15 |
| Resistor **30** | 18 KΩ |
| Condenser **36** | 0.02 $\mu f$. |

The oscillating frequency with the above-indicated values of resistor 30 and condenser 36 is 800 c./s.

What is claimed is:

1. In a radio communication apparatus, a receiver circuit comprising a frequency converter, an intermediate-frequency amplifier transistor connected to said frequency converter, means for applying automatic gain-controlling voltage to said intermediate-frequency amplifier transistor, a low-frequency amplifier transistor, a transistor power amplifier connected to said low frequency amplifier transistor, a resistor through which flows the emitter current of said intermedite-frequency amplifier transistor and the emitter current of said low-frequency amplifier transistor concurrently, means for selectively feeding back the output signal of said low-frequency amplifier transistor to the input electrode thereof during the stand-by period of said receiver circuit and means for selectively interrupting the base bias current of said transistor power amplifier during said period, the collector current of said low-frequency amplifier transistor being increased in response to decrease in the collector current of said intermediate-frequency amplifier transistor upon receipt of any incoming signal for effecting oscillation of said low-frequency amplifier transistor, the output of said oscillation serving to excite said transistor power amplifier to amplify said oscillation output for indicating that signals are being received.

2. The receiver circuit according to claim 1, additionally comprising an indication lamp connected between the collector electrode of said transistor power amplifier and an electrical source, the oscillation output of said low-frequency amplifier transistor exciting said low-frequency power amplifier transistor during the period when signals are being received by said receiver circuit, said indication lamp being energized by the output of said transistor power amplifier to provide a visual indication of the arrival of said signals.

3. In a radio communication receiver including a frequency converter for converting an input signal received by the receiver to an intermediate frequency signal, an intermediate frequency amplifier for amplifying the output of said converter, a detector producing an automatic gain controlling voltage and an audible frequency signal by detecting the output of the intermediate frequency amplifier, means for applying the gain controlling voltage to the intermediate frequency amplifier in such a manner as to reduce the gain of the intermediate frequency amplifier, a low frequency amplifier for amplifying the audible frequency signal output of the detector, and a low frequency power amplifier for amplifying the output of the low frequency amplifier, a stand-by circuit for placing the receiver in a stand-by state of low power dissipation comprising:

means for varying the gain of the low frequency amplifier in inverse proportion to the changes in gain of the intermediate frequency amplifier produced by the gain controlling voltage applied thereto, feedback means for positively feeding back the output of the low frequency amplifier to the input thereof, and means for selectively connecting said feedback means between the input and the output of said low frequency amplifier while reducing the gain thereof below the level necessary to sustain oscillations in the amplifier, said low frequency amplifier being disposed to generate an oscillation signal only when its gain is increased by virtue of decrease in gain of said intermediate frequency amplifier as a result of the receiver receiving an input signal during the stand-by state, means for selectively eliminating the control bias of the low frequency power amplifier to produce a cut-off condition thereof sufficient to interrupt the operating current of the low frequency power amplifier during the stand-by period, and transducing means for transducing the oscillation signal generated by the low frequency amplifier to an audio signal whereby receipt of the input signal to the receiver is indicated during its stand-by state.

4. In a radio communication receiver according to claim 3, wherein said intermediate frequency amplifier and said low frequency amplifier comprise grounded emitter transistors and the emitter of said intermediate frequency transistor amplifier is connected with the emitter electrode of said low frequency transistor amplifier, said two emitter electrodes being grounded through a common resistor.

5. In a radio communication receiver according to claim 3, wherein said intermediate frequency amplifier comprises a grounded emitter transistor, and said low frequency amplifier comprises a first stage amplifier for amplifying a low frequency signal fed to said first stage amplifier from said detector and a second stage amplifier for amplifying the output signal of said first stage amplifier and feeding the resulting amplified signal to said low frequency power amplifier, said second stage amplifier having at its input circuit a control transistor connected with the input circuit for varying the gain of said second stage amplifier, the input electrode of said control transistor being connected with the emitter electrode of said intermediate frequency transistor amplifier and grounded through a common resistor, and said feedback means includes a feedback path starting at the output terminal of said second stage amplifier and connected to the input terminal of said first stage amplifier.

6. In a radio communication receiver according to claim 3 wherein said low frequency amplifier comprises a first stage amplifier for amplifying a low frequency signal fed to said first stage amplifier from said detector and a second stage amplifier for amplifying the output signal of said first stage amplifier and feeding the resulting amplified signal to said low frequency power amplifier, said second stage amplifier being so arranged that the gain of said second stage amplifier is varied to increase when the gain of said intermediate frequency amplifier is decreased and to decrease when the latter is increased by low frequency amplifier gain varying means, and said feedback means includes a feedback path starting at the output terminal of said second stage amplifier and connected to the input terminal of said second stage amplifier, and means for rendering the first stage amplifier inoperative when the receiver is in its standby state.

7. In a radio communication receiver according to claim 3, further including lamp means connected to said oscillation signal transducing means for providing a visual indication including a lamp arranged in the output current path of said low frequency power amplifier whereby said lamp is operated by an output current of said power amplifier to indicate reception of a communication signal when the signal is received.

8. In a radio communication receiver according to claim 3, wherein the oscillation signal from said low frequency amplifier serves as the operation source for said low frequency power amplifier biased by a cut off bias, and said oscillation signal transducing means is a speaker connected with the output terminal of said low frequency power amplifier.

9. In a radio communication receiver according to claim 4, wherein a diode is inserted in the circuit connection between the emitter electrode of said intermediate frequency transistor amplifier and the emitter electrode of said low frequency transistor amplifier.

10. In a radio communication receiver according to claim 9, wherein the arrangement of said diode is such that it is conductive in the direction from the emitter electrode of said low frequency transistor amplifier to the emitter electrode of said intermediate frequency transistor amplifier.

11. In a radio communication receiver including a low frequency amplifier, power amplifier for amplifying the output of said low frequency amplifier, and transducer means for converting the output of said power amplifier to an audible signal, the improvement comprising:

bias means connected to said power amplifier for biasing said amplifier to a state of operation above cut-off;

first means for selectively manually disconnecting said bias means from said power amplifier so as to reduce said amplifier to a cut-off condition;

feedback means for positively feeding back the output of said low frequency amplifier to the input thereof;

second means for selectively manually connecting the input of said low frequency amplifier to said feedback means, and means for adjusting the gain of said low frequency amplifier in response to receipt of any signal by said receiver during operation of said first and second means to render said low frequency amplifier oscillatory thereby applying an audible signal through said power amplifier to said transducer.

12. The combination defined in claim 11 further including a frequency converter for converting an input signal received by the receiver to an intermediate frequency signal, an intermediate frequency amplifier for amplifying the output of said converter and a detector for detecting the output of said intermediate frequency amplifier, and wherein said adjusting means includes circuit means connected between said intermediate frequency amplifier and said low frequency amplifier for increasing the gain of the latter upon receipt of a signal by said detector.

13. The combination defined in claim 12 further including automatic gain control means connected between the output of said detector and the input of said intermediate frequency amplifier for reducing the gain of the latter upon receipt of a signal by said detector.

14. The combination defined in claim 13 wherein said circuit means includes a transistor amplifier having its base electrode connected to said intermediate frequency amplifier and its collector electrode connected to the input of said low frequency amplifier.

References Cited

UNITED STATES PATENTS

| | | | |
|---|---|---|---|
| 1,804,526 | 5/1931 | Coxhead | 325—492 |
| 2,367,327 | 1/1945 | Beers | 325—466 X |
| 2,367,378 | 1/1945 | Schick | 325—364 |
| 2,437,876 | 3/1948 | Cohn | 325—364 |
| 2,447,156 | 8/1948 | Brittain | 325—364 |
| 2,899,547 | 8/1959 | Crow et al. | |
| 3,090,013 | 5/1963 | Scantlin et al. | |

JOHN W. CALDWELL, *Primary Examiner.*